Nov. 19, 1968    E. T. JAGGER ET AL    3,411,793
SHAFT SEALS

Filed June 11, 1965    2 Sheets-Sheet 1

Nov. 19, 1968  E. T. JAGGER ET AL  3,411,793
SHAFT SEALS

Filed June 11, 1965  2 Sheets-Sheet 2

3,411,793
SHAFT SEALS
Ernest T. Jagger and Geoffrey W. Halliday, Newcastle-upon-Tyne, England, assignors to George Angus & Company Limited, Newcastle-upon-Tyne, England
Filed June 11, 1965, Ser. No. 463,114
Claims priority, application Great Britain, June 22, 1964, 25,660/64
6 Claims. (Cl. 277—32)

ABSTRACT OF THE DISCLOSURE

A shaft seal having an oil feed-back thread at its sealing periphery is provided, at the oil side, with a supplementary sealing lip, preferably with oil-admission holes, to retain oil close to at least part of the sealing periphery to prevent the seal running dry in consequence of the feed-back action.

---

Figure 1:
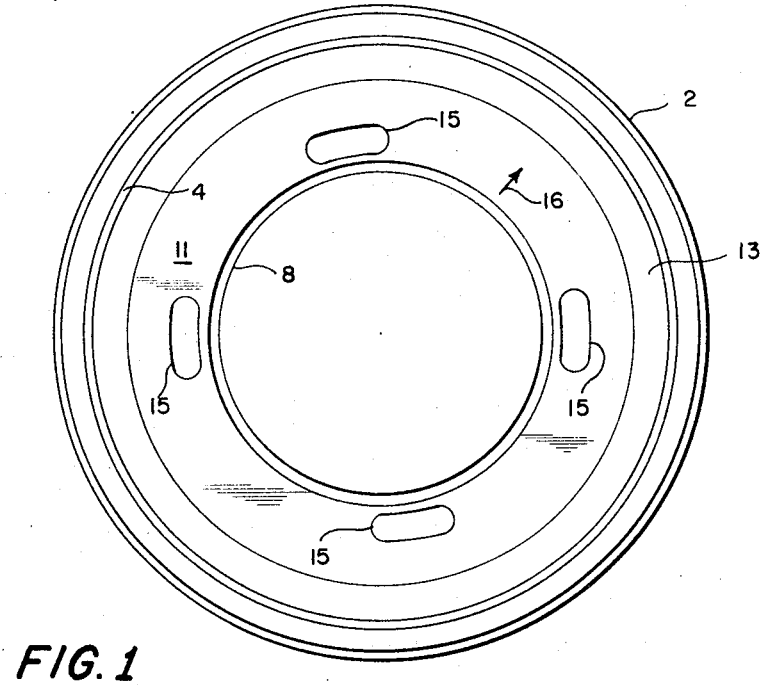

This invention relates to shaft seals, also called oil seals, of the kind intended to prevent leakage of oil and which each comprise a sealing ring of resilient material, such as rubber, which embraces the shaft in a housing and has a sealing periphery for wiping contact with a relatively movable cylindrical sealed surface of the shaft, for an internal seal, or the housing, for an external seal. This kind of shaft seal will hereinafter be referred to as "the kind defined."

One of the difficulties with shaft seals and other oil seals, and which is somewhat of a paradox, is that some access of oil to the sealing periphery of the seal is desirable to avoid wear of the seal surface which is likely to result from a dry sealing contact, particularly with seals made of silicone rubbers.

Such wear at a dry sealing surface is noticeable in some motor vehicle engine crankshaft main bearing seals which, because of engine design, are likely to run dry for considerable periods.

The present invention provides an oil seal, and particularly, but not exclusively, an internal shaft seal especially suitable for crankshaft main bearing journals, which promotes lubrication without leakage at the sealing periphery of the seal.

The invention makes use of a feature, known in shaft seals, of providing the sealing periphery of the seal with a helical thread designed, on relative rotation at the sealed surface, to feed back oil towards the inner face of the seal. By the "inner face" of the seal is meant that face exposed to the oil to be held against leakage.

According to the invention, a shaft seal of the kind defined, and having an oil feed-back helical thread on its sealing periphery, is provided at its inner face with a supplementary lip designed to contact the sealed surface and to admit and retain oil in proximity to at least a part of the sealing periphery of the sealing ring.

Preferably, the helical thread is a multi-start screw thread moulded on the sealing periphery of the sealing ring. In particular, the sealing periphery of the sealing ring, on a resilient bush or flange thereof, has a frusto-conical surface leading to a circumferential sealing edge or lip and moulded on such frusto-conical surface with a multi-start thread.

The supplementary lip may be provided by a separate ring of rubber, or like resilient material, attached to the sealing ring. Alternatively, the sealing ring itself may be provided with an integral supplementary lip, conveniently moulded therewith.

Preferably, the supplementary lip has holes to admit oil up to and around the sealing periphery of the sealing ring.

For an internal seal, particularly a crankshaft seal, the holes in the supplementary lip are so arranged in relation to a part of the seal which is mounted uppermost in the housing, such part being suitably marked for instruction in installation, that a lower part of the supplementary lip retains oil up to a lower part of the sealed shaft surface when the shaft is stationary. On starting-up, the shaft surface then has oil in contact with it over at least part of its circumference at the sealing periphery of the sealing ring which cannot therefore run dry and cause wear.

Figure 3:
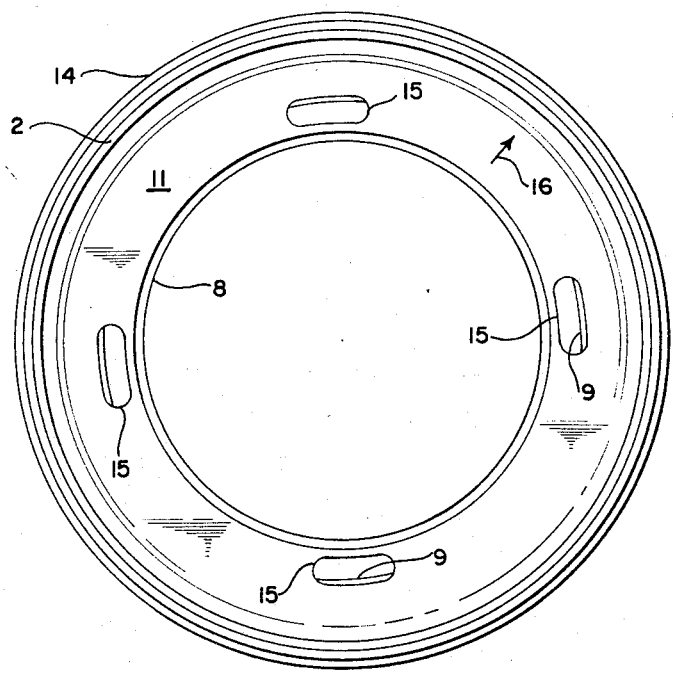
Figure 2:
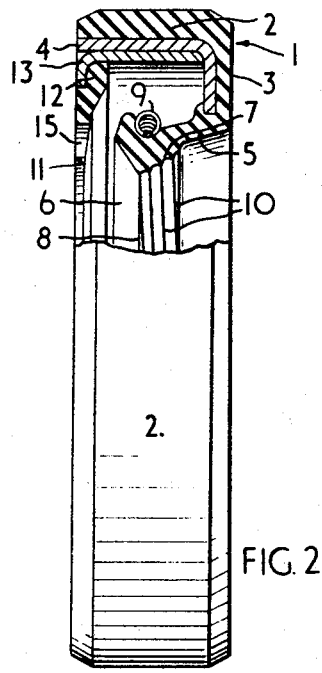
Figure 4:
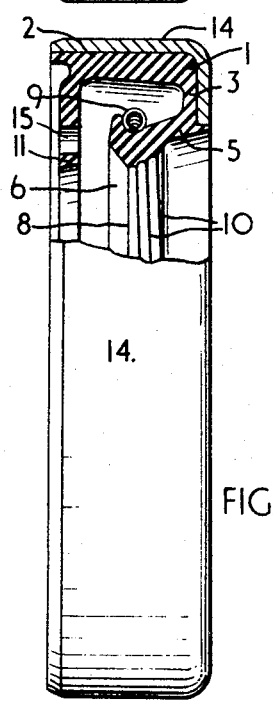
Figure 5:
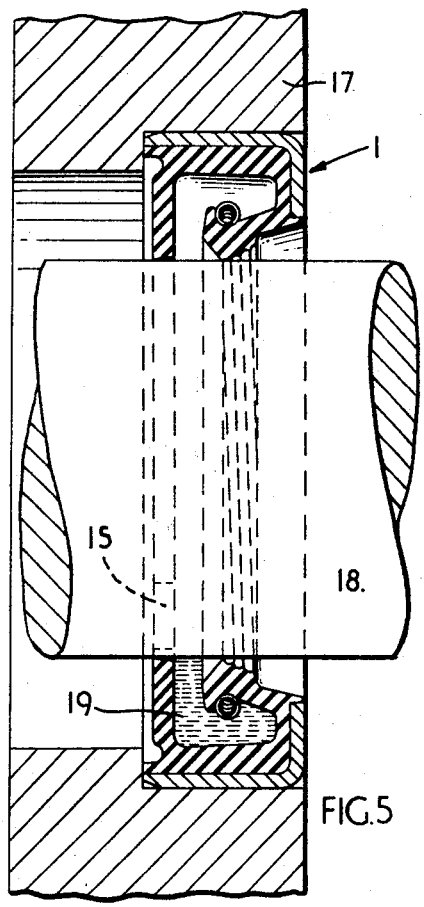

Two embodiments of the invention are illustrated, by way of example, on the accompanying drawings, in which:

FIGS. 1 and 2 are respectively an elevation of the inner face and a part-sectional side elevation of a shaft seal with a separately-made and inserted supplementary lip, FIGS. 3 and 4 are views, similar to FIGS. 1 and 2, showing a shaft seal with an integral supplementary lip and FIG. 5 is an axial section of a shaft seal, as shown by FIGS. 3 and 4, in place in a housing around a shaft.

The seal shown by FIGS. 1 and 2 is basically of a known type comprising a moulded synthetic rubber sealing ring 1 of axially-directed channel cross-section with an axial mounting flange or wall 2 and a substantially radial web 3, both stiffened by an L-section metal ring as a rigid insert 4, and an axial sealing bush 5 with a doubly frusto-conical internal sealing periphery 6, 7 presenting a sealing edge 8 loaded by a garter spring 9. A multi-start screw thread 10 is moulded on the outer frusto-conical surface 7 of the sealing periphery. The screw thread 10 acts, in the known manner, to feed back oil which might leak past the sealing edge 8 from the inner face of the seal.

In accordance with the present invention, a supplementary lip 11 is provided by a synthetic rubber ring 12 fitted, by an L-section metal insert ring 13 having a stiff axial flange axially interengaged inside the metal ring 4, in the channel of the sealing ring 1. The supplementary lip 11 is designed to bear lightly, by its inner edge against the shaft surface, with a small axial spacing from the inner frusto-conical surface 6 of the sealing ring 1.

In the embodiment shown by FIGS. 3 and 4, the supplementary lip 11 is a transversely radial flange moulded integrally with the axial wall 2 of the ring 1 and the seal is stiffened by an outer metal case ring 14 instead of by the inserts 4 and 13. In other respects, the seal of FIGS. 3 and 4 is similar to that of FIGS. 1 and 2 and the same reference numerals denote corresponding parts.

Spaced around and extending axially through the supplementary lip 11 are four holes 15 to admit oil, from the inside of the housing in which the seal is installed, to the channel of the sealing ring 1 and up to and around the inner frusto-conical surface 6 of the sealing periphery. The lip 11 is marked, by an arrow 16 (FIG. 2), to indicate that the seal is to be installed in a housing with the arrow 16 at the top so that none of the holes 15 is at the bottom and some oil will be retained by the lip 11 when the shaft is stationary (FIG. 5).

In FIG. 5, a seal as illustrated by FIGS. 3 and 4 is shown mounted as an interference press fit in a housing 17 and embracing a shaft 18, e.g. a crankshaft main bearing journal, so as to retain, when the shaft 18 is stationary, a small pool of oil 19 behind the supplementary lip 11 between the two lowermost holes 15.

We claim:

1. A shaft seal comprising a seal ring of resilient material and having an inner face designed to be exposed, in use, to oil to be held against leakage, said sealing ring having a sealing periphery designed to contact a cylindrical surface to be sealed, oil feed-back thread means on said sealing periphery, and lip means at said inner face of the seal, axially spaced from said sealing periphery and designed to contact said cylindrical surface, said lip means having apertures axially therethrough to admit oil to said sealing periphery, and said apertures being spaced apart circumferentially and arranged so that, in position of use, a lower part of said lip means can retain oil in proximity to a part of said sealing periphery.

2. A shaft seal according to claim 1, said lip means consisting of a transversely radial flange integral with said ring.

3. A shaft seal according to claim 1, said lip means comprising an L-section rigid ring having an axial flange and a radial flange and an axially-apertured lip ring of rubber-like resilient material carried by said radial flange, said axial flange being axially interengaged with said sealing ring.

4. A shaft seal having an inner face which is designed to be exposed, in use, to oil to be held against leakage, said seal comprising a moulded circular sealing ring of oil-resistant synthetic rubber, said sealing ring having an axially-directed annular channel defined by an axial annular flange, a substantially radial web and an axial sealing bush, an L-section rigid circular ring with an axial annular flange and a radial flange coaxial with said sealing ring respectively bonded to said axial annular flange and said radial web of said sealing ring, said sealing bush having a sealing periphery with two oppositely axially-directed frusto-conical surfaces diverging from a circumferential sealing edge, that one of said frusto-conical surfaces which is axially directed oppositely from the axial direction of said channel of said sealing ring having moulded thereon a multi-start screw thread, and a transversely radial, circular, annular resilient lip, at said inner face of said seal, extending coaxially across the mouth of said channel and axially spaced from the other one of said frusto-conical surfaces, the diameter of the edge of said lip being substantially equal to the diameter of said sealing edge and said lip having holes extending axially therethrough, said holes being spaced apart circumferentially and arranged so that, in position of use, a lower part of said lip between said holes can retain oil, admitted through said holes, in proximity to part of said sealing periphery.

5. A shaft seal according to claim 4, in which said lip consists of a transversely radial flange moulded integrally with said axial flange of said sealing ring.

6. A shaft seal according to claim 4, said lip comprising an annulus of oil-resistant synthetic rubber, a second L-section rigid circular ring with an axial flange and a radial flange, said axial flanges of said rigid circular rings being axially interengaged and said annulus being bonded to said radial flange of said second rigid circular ring.

References Cited

UNITED STATES PATENTS

| 2,446,380 | 8/1948 | Meyers et al. | 277—207 |
| 2,992,027 | 7/1961 | Wright et al. | 227—153 X |
| 3,044,786 | 7/1962 | Chillson | 277—75 X |

FOREIGN PATENTS

| 1,376,589 | 9/1964 | France. |

SAMUEL ROTHBERG, *Primary Examiner.*